United States Patent
Rupp

(10) Patent No.: US 6,393,068 B1
(45) Date of Patent: May 21, 2002

(54) COMMUNICATION CHANNEL AND FREQUENCY OFFSET ESTIMATOR

(75) Inventor: Markus Rupp, Middletown, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/158,587

(22) Filed: Sep. 22, 1998

(51) Int. Cl.[7] ............................................... H04L 27/16
(52) U.S. Cl. ........................ 375/326; 375/344; 375/346; 329/318
(58) Field of Search ................................ 375/324, 326, 375/340, 344, 346; 329/318

(56) References Cited

U.S. PATENT DOCUMENTS

| | | | | |
|---|---|---|---|---|
| 4,520,493 A | | 5/1985 | Heard et al. ................. 375/97 |
| 5,150,380 A | | 9/1992 | Okanoue ..................... 375/16 |
| 5,245,611 A | * | 9/1993 | Ling et al. .................. 370/100 |
| 5,255,290 A | | 10/1993 | Anvari ........................ 375/97 |
| 5,297,165 A | * | 3/1994 | Ueda et al. ................... 375/12 |
| 5,311,546 A | | 5/1994 | Paik et al. ................... 375/14 |
| 5,422,917 A | | 6/1995 | Scott .......................... 375/371 |
| 5,434,889 A | * | 7/1995 | Baier ......................... 375/344 |
| 5,499,268 A | | 3/1996 | Takahashi ................... 375/231 |
| 5,563,888 A | | 10/1996 | Parr et al. .................. 370/95.1 |
| 5,684,836 A | * | 11/1997 | Nagayasu et al. ........... 375/326 |
| 5,751,766 A | | 5/1998 | Kletsky et al. ............. 375/224 |
| 6,028,901 A | * | 2/2000 | Huynh et al. ............... 375/350 |
| 6,097,770 A | * | 8/2000 | Bahai et al. ................. 375/343 |

OTHER PUBLICATIONS

N. K. Jablon, "Joint Blind Equalization, Carrier Recovery, and Timing Recovery for High–Order QAM Signal Constellations", *IEEE Transactions On Signal Processing*, vol. 40, No. 6, Jun. 1992, pp. 1383–1397.

* cited by examiner

Primary Examiner—Stephen Chin
Assistant Examiner—Dac V. Ha

(57) ABSTRACT

Estimates of both the communication channel impulse response coefficients and a received signal carrier frequency offset are generated simultaneously without either estimation interfering with or hampering of the other estimation. This is realized in an embodiment of the invention by utilizing both received symbols known to the receiver during a training sequence and a received signal to generate simultaneously an estimate of the impulse response coefficients of the communication channel and an estimate of the received signal carrier frequency offset. In one embodiment of the invention a first estimator and a second estimator are employed to generate the communication channel impulse response coefficients and the received signal carrier frequency offset, respectively. Specifically, in the first estimator, (a) data symbols in the training sequence, (b) the magnitude of the received signal, (c) the magnitude of an estimate for the received signal and (d) a step size based on a learning coefficient are employed in a first prescribed relationship to generate the communication channel impulse response coefficients. Simultaneously, in the second estimator, a second prescribed relationship between the received signal and its estimate is employed to generate the received signal carrier frequency offset. In another embodiment of the invention, the estimation process is begun utilizing the first estimator to generate the communication channel impulse response coefficients and the second estimator to generate the received signal carrier frequency offset, with the latter being monitored. When the estimated frequency offset falls below a predetermined threshold value, the generation of the communication channel impulse response coefficients is switched to use a third estimator, for example, a least mean squares (LMS) estimator, while generation of the received signal carrier frequency offset estimation continues simultaneously.

60 Claims, 3 Drawing Sheets

COMMUNICATION CHANNEL AND FREQUENCY OFFSET ESTIMATOR

TECHNICAL FIELD

This invention relates to communication systems and, more particularly, to estimation of the impulse response coefficients of a communication channel and of the carrier frequency offset.

BACKGROUND OF THE INVENTION

In communication systems, for example, digital wireless or the like, received data symbols are corrupted by distortion caused by the communication channel over which they were transmitted and noise. Additionally, the data symbols are also corrupted by carrier frequency offset caused by disparity in the frequencies of a remote transmitter and a local receiver.

The problem is to generate an estimate of the communication channel impulse response coefficients and an estimate of the frequency offset simultaneously in the presence of the data symbol distortion. In prior arrangements, one being the least mean squares (LMS) algorithm, the obtained estimate of the communication channel impulse response coefficients is accurate only in the presence of relatively small frequency offset values. The LMS algorithm is not capable of tracking rapid changes in the communication channel impulse response caused by frequency offset and, consequently, looses its capability to estimate the communication channel impulse response coefficients. This is extremely undesirable in communication systems requiring rapid carrier frequency acquisition and tracking, for example, burst communication systems, e.g., time division multiple access (TDMA) or the like.

Note that in prior arrangements, it was usually required to generate a separate frequency offset value in order to improve the estimation of the communication channel impulse response coefficients or to generate a separate estimate of the communication channel impulse response coefficients in order to improve the frequency offset estimation.

SUMMARY OF THE INVENTION

These and other problems and limitations of prior known arrangements are overcome by employing apparatus and/or a process which simultaneously generates estimates of both the communication channel impulse response coefficients and the received signal carrier frequency offset at the same time without either estimation interfering with or hampering of the other estimation. This is realized in an embodiment of the invention by utilizing both received symbols known to the receiver during a training sequence and a received signal to generate simultaneously an estimate of the impulse response coefficients of the communication channel and an estimate of the received signal carrier frequency offset.

In one embodiment of the invention a first estimator and a second estimator are employed to generate the communication channel impulse response coefficients and an estimate of the received signal carrier frequency offset, respectively. Specifically, in the first estimator, (a) data symbols in the training sequence, (b) the magnitude of the received signal, (c) the magnitude of an estimate for the received signal and (d) a step size based on a learning coefficient are employed in a first prescribed relationship to generate the communication channel impulse response coefficients. Simultaneously, in the second estimator, a second prescribed relationship between the received signal and its estimate is employed to generate the estimate of the received signal carrier frequency offset.

In another embodiment of the invention, the estimation process is begun utilizing the first estimator to generate the communication channel impulse response coefficients and, simultaneously, the second estimator to generate the estimate of the received signal carrier frequency offset, with the latter being monitored. When the estimated frequency offset falls below a predetermined threshold value, the generation of the communication channel impulse response coefficients is switched to use a third estimator, for example, a least mean squares (LMS) estimator, while generation of the received signal carrier frequency offset estimation continues simultaneously.

DETAILED DESCRIPTION

A. THEORETICAL DISCUSSION

Figure 1:
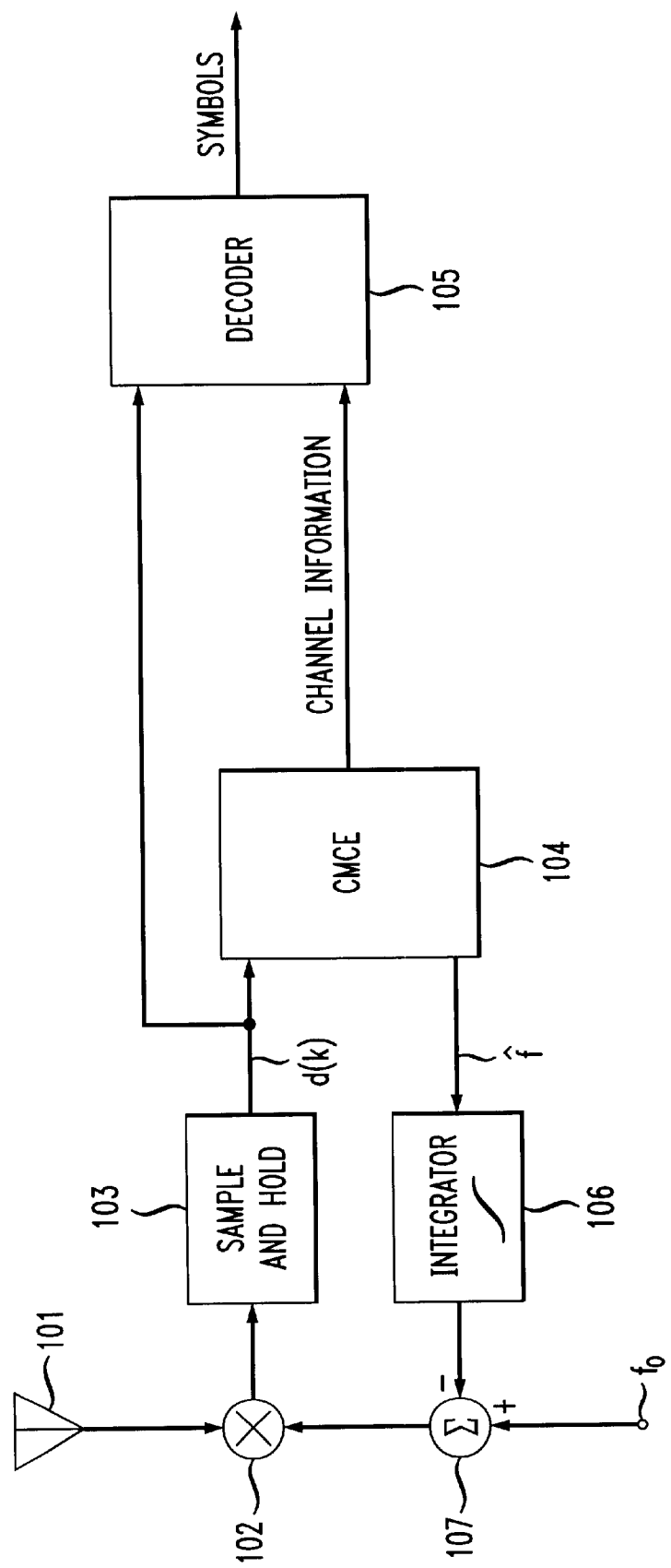
FIG. 1 shows, in simplified block diagram form, details of a receiver including an embodiment of the invention.

1. Constant Modulus Communication channel Estimation (CMCE) Process

I have recognized that $|d(k)|$ is not dependent on the frequency offset. Therefore, by employing $|d(k)|$ in my unique CMCE process, the estimation of the communication channel impulse response coefficients is largely insensitive to frequency offset and is as follows:

$$w_{k+1}=w_k+\mu(k)(|d(k)|^2-|y(k)|^2)y(k)u_k^*, \quad (1)$$

and $$y(k)=u_k w_k, \quad (2)$$

where $w_k$ is a row vector representing an estimate of the communication channel impulse response coefficients "c" at time (k), d(k) is the received signal, y(k) is an estimate of the received signal, $\mu(k)$ is an adaptation step size and $u_k$ is a known sequence of data symbols, e.g., a training sequence. Note that "*" indicates the conjugate operation.

The training sequence in the received signal is represented as a column vector defined as follows:

$$u_k=[u(k), u(k-1), \ldots, u(k-M)], \quad (3)$$

where the dimension of the vector $u_k$ is 1×M+1. It should be noted that the training sequence must be larger than M+1 symbols in order to use the update equation (1) several times. In this context, update equation (1) is applied N times and, consequently, requires N+M training symbols.

Symbols $u_k$ are typically corrupted by intersymbol interference, additive noise and frequency offset. Thus, the received signal is defined as:

$$d(k)=(u_k c+v(k))\times e^{j\hat{\Omega}k}, \quad (4)$$

where $\hat{\Omega}/2\pi T_s$ is the frequency offset and $T_s$ is the symbol time duration. The step size is defined as follows:

$$\mu(k) = \frac{\alpha}{|y(k)|[|d(k)| + |y(k)|]}, \quad (5)$$

where α is a constant representative of a learning coefficient.

The frequency offset estimation employing the CMCE process is defined as follows:

$$\hat{f} = \frac{\hat{\Omega}}{2\pi T_s} = \frac{1}{N}\sum_{k=1}^{N} L\{d(k)y^*(k)d^*(k+1)y(k+1)\}, \quad (6)$$

where N is the number of training iterations and * indicates the conjugate of the expression.

2. Least Mean Squares (LMS) Algorithm

The LMS algorithm has long been employed in adaptive filters to estimate the impulse response of signal communication channels. (See, for example, any of the following texts: Colin F. N. Cowan, et al., *Adaptive Filters*, Englewood Cliffs, N.J.: Prentice-Hall, Signal Processing Series, 1985; Simon Haykin, *Adaptive Filter Theory*, Englewood Cliffs, N.J.: Prentice-Hall, Information and System Sciences Series, 1986; Bernard Widrow and Samuel D. Stearns, *Adaptive Signaling Processing*, Englewood Cliffs, N.J.: Prentice-Hall, Signal Processing Series, 1985).

The LMS process for estimation of the communication channel impulse response coefficients is as follows:

$$w_{k+1} = w_k + \mu(k)e(k)u_k^*, \quad (7)$$

where the step size is $$\mu(k) = \frac{\alpha}{\|u_k\|^2}, \quad (8)$$

where the error signal is $$e(k) = d(k) - y(k) \quad (9)$$

and where the estimate for d(k) is $$y(k) = u_k w_k. \quad (10)$$

Again, it is noted that when using the LMS algorithm the resultant estimate of the communication channel impulse response coefficients is accurate only for relatively small values of frequency offset.

B. Preferred Embodiments

FIG. 1 shows, in simplified block diagram form, details of a receiver including an embodiment of the invention. Specifically, shown is an antenna 101 for receiving a transmitted data signal, for example a time division multiple access (TDMA) signal. The resulting received data signal is supplied to one input of mixer 102 where it is mixed with an adjusted carrier frequency signal from algebraic combining unit 107 to yield a received signal. Samples representative of the received signal from an output of mixer 102 are obtained and stored in sample and hold unit 103. The received signal d(k) is supplied to decoder 105 and to constant modulus communication channel estimator (CMCE) 104, where it is utilized to generate communication channel information $w_k+1$, in accordance with equation (1) noted above. This is realized by obtaining the last past M+1 data symbols, namely, $u_k$, in accordance with equation (3). Training sequence $u_k$ is employed with $w_k$, in accordance with equation (2) to generate estimate y(k). Note that from equation (1), $w_k$ is $\mu(k)(|d(k)|^2-|y(k)|^2)y(k)u_k^*$ and that step size $\mu(k)$ is obtained in accordance with equation.(5). Thus, CMCE 104 generates the conjugate of $u_k$, namely, $u_k^*$, y(k), $\mu(k)$, |d(k)|, $|d(k)|^2$, |y(k)|, $|y(k)|^2$ and $w_k$, and employs them in equation (1) to generate the communication channel information, i.e., $w_{k+1}$. Note that the communication channel information is an updated version of the communication channel impulse response coefficients, namely, $w_{k+1}$. The communication channel information is then supplied to decoder 105 together with the received signal d(k), which decodes the supplied information, in well known fashion, to yield the desired data symbols as an output. It is again noted that in generating the communication channel information, |d(k)| is employed which makes the communication channel information generation process largely insensitive to the carrier frequency offset.

Simultaneous with generating the communication channel information $w_{k+1}$, CMCE unit 104 generates an estimate of the carrier frequency offset f̂, in accordance with equation (6) noted above. To this end, CMCE 104 additionally generates y*(k), d*(k+1) and y(k+1) and utilizes them along with received signal d(k) in equation (6) as indicated above. The frequency offset f̂ value is supplied to integrator 106 where it is integrated over the entire data set to compensate it. The integrated frequency offset value is supplied to algebraic combiner 107 where it is, in this example, algebraically subtracted from carrier frequency $f_0$ to yield a compensated carrier frequency. The compensated carrier frequency output from algebraic combiner 107 is supplied to a second input of mixer 102.

Figure 2:
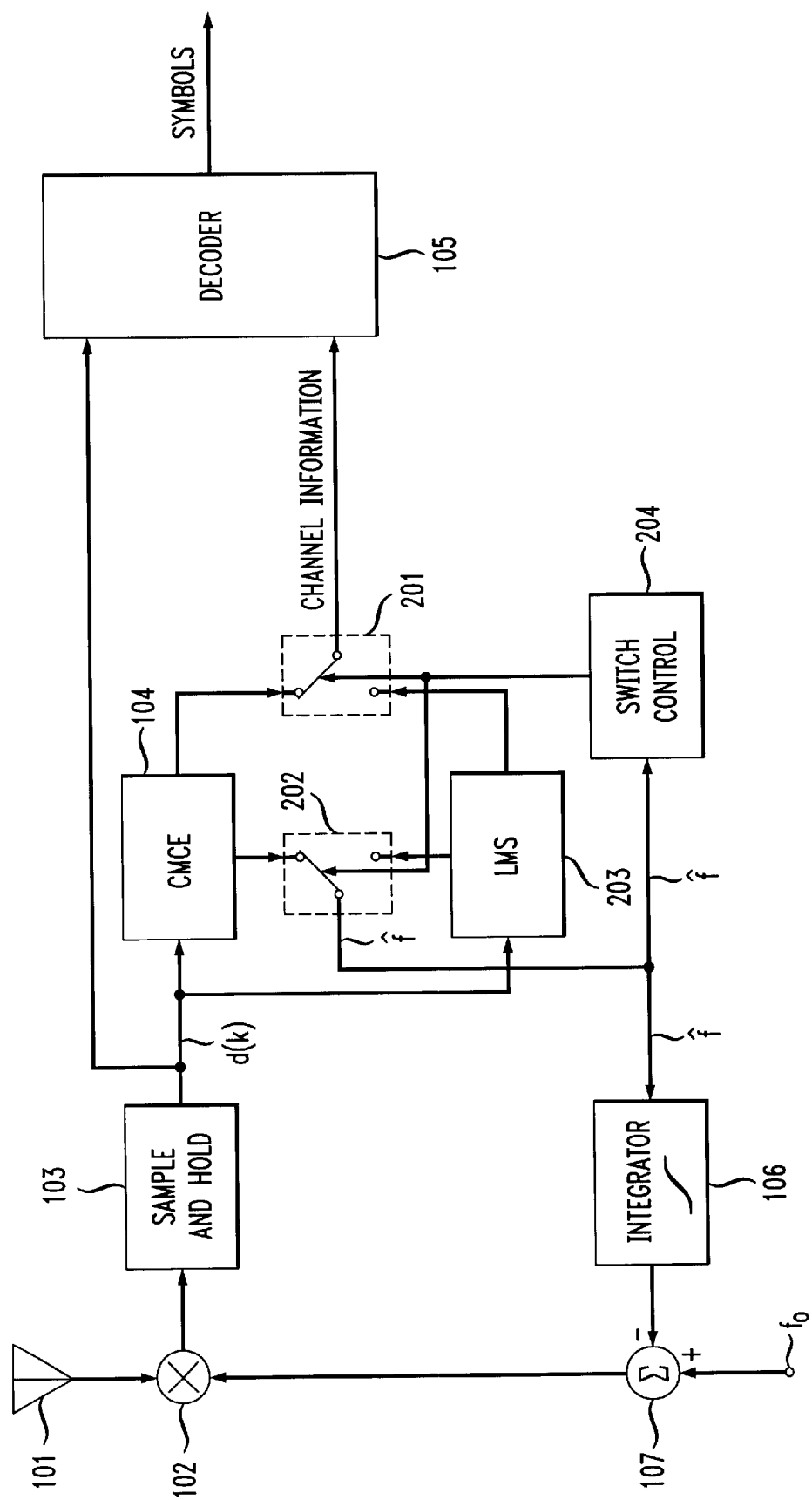
FIG. 2 shows, in simplified block diagram form, details of a receiver including another embodiment of the invention.

FIG. 2 shows, in simplified block diagram form, details of a receiver including another embodiment of the invention. Elements of the embodiment shown in FIG. 2 which are essentially identical in structure and operation as those shown in FIG. 1 have been similarly numbered and are not described again in detail. Specifically, shown is an antenna 101 for receiving a transmitted data signal, for example a time division multiple access (TDMA) signal. The resulting received data signal is supplied to one input of mixer 102 where it is mixed with an adjusted carrier frequency signal from algebraic combining unit 107 to yield a received signal. Samples representative of the received signal from an output of mixer 102 are obtained and stored in sample and hold unit 103. The received signal d(k) is supplied to inputs of CMCE 104, least mean squares (LMS) estimator 203 and decoder 105. Controllable switching element 202 is responsive to the control signal from switch control 204 to supply a carrier frequency offset estimate f̂ output from either CMCE 104 or LMS 203 to integrator 106 and switch control 204. Switch control 204 monitors the level of the carrier frequency offset estimate f̂ to control switching of switching elements 201 and 202. Controllable switching element 201 is also responsive to the control signal from switch control 204 to supply communication channel information, i.e., communication channel impulse response coefficients, as an output from either CMCE 104 or LMS 203 to decoder 105. In operation CMCE 104 is initially connected via controllable switching elements 201, and 202 under control of switch control 204 to supply carrier frequency offset estimate f̂ to integrator 106 and switch control 204, and to supply communication channel information to decoder 105. CMCE 104 operates to generate simultaneously both the carrier frequency offset estimate f̂ and the communication channel information as described above in relationship to FIG. 1.

Upon the carrier frequency offset estimate f̂ generated by CMCE 104 falling below a predetermined threshold value switch control 204 sends a control signal to switching elements 201 and 202 causing them to switch so that the frequency offset $\hat{f}$ is supplied as an output from LMS 203 via switching element 202 to integrator 106 and switch control 204 and the communication channel information output from LMS 203 is supplied via switching element 201 to decoder 105.

LMS 203 is operative to generate the communication channel information, i.e., communication channel impulse response coefficients $w_{k+1}$ in accordance with equation (7) described above. Note that $w_k$ in equation (7) is a vector representing the last past generated communication channel impulse response coefficients, namely, $\mu(k)e(k)u_k^*$, which is being updated at time k in equation (7). To this end, LMS 203 generates $\mu(k)$ in accordance with equation (8), e(k) in accordance with equation (9) and y(k) in accordance with equation (10). Again, $u_k$ is a vector representative of a training sequence of symbols and $u_k^*$ is the conjugate of $u_k$. LMS 203 also generates the carrier frequency offset estimate, in accordance with equation (6), using y(k of equation (10) and its conjugate.

As in FIG. 1, the carrier frequency offset estimate $\hat{f}$ is supplied to integrator 106 where it is integrated over the entire data set to compensate it. The integrated frequency offset value is supplied to algebraic combiner 107 where it is, in this example, algebraically subtracted from carrier frequency $f_0$ to yield a compensated carrier frequency. The compensated carrier frequency output from algebraic combiner 107 is supplied to a second input of mixer 102.

Figure 3:
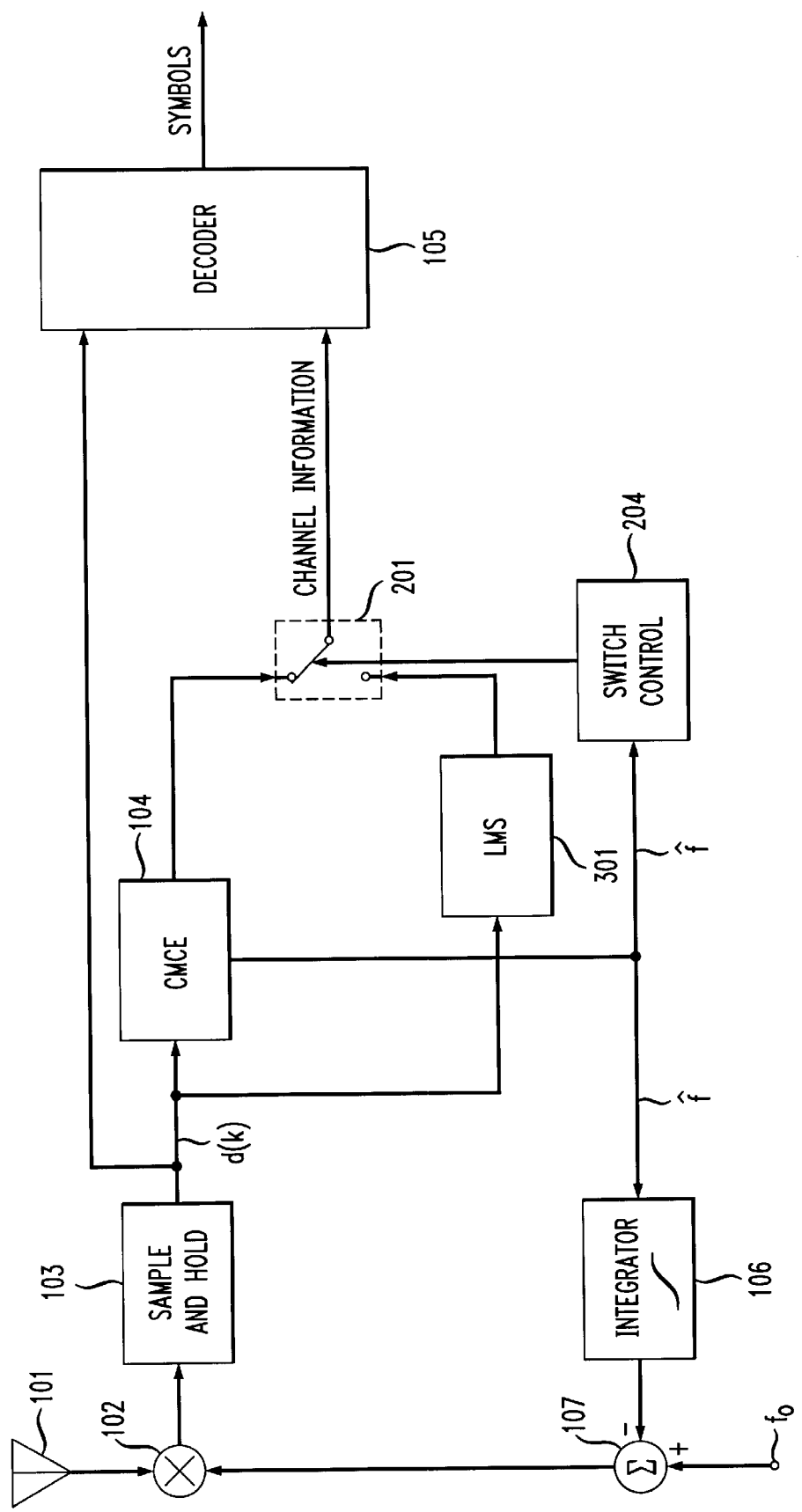
FIG. 3 shows, in simplified block diagram form, details of a receiver including still another embodiment of the invention.

FIG. 3 shows, in simplified block diagram form, details of a receiver including still another embodiment of the invention. Elements of the embodiment shown in FIG. 3 which are essentially identical in structure and operation as those shown in FIGS. 1 and 2 have been similarly numbered and are not described again in detail. Specifically, shown is an antenna 101 for receiving a transmitted data signal, for example a time division multiple access (TDMA) signal. The resulting received data signal is supplied to one input of mixer 102 where it is mixed with an adjusted carrier frequency signal from algebraic combining unit 107 to yield a received signal. Samples representative of the received signal from an output of mixer 102 are obtained and stored in sample and hold unit 103. The received signal d(k) is supplied to inputs of CMCE 104, least mean squares (LMS) estimator 301 and decoder 105. The carrier frequency offset estimate $\hat{f}$ output from either CMCE 104 is supplied to integrator 106 and switch control 204. Switch control 204 monitors the level of the carrier frequency offset estimate $\hat{f}$ to generate a switch control signal for controlling switching of switching element 201. Controllable switching element 201 is responsive to the control signal from switch control 204 to supply communication channel information, i.e., communication channel impulse response coefficients, as an output from either CMCE 104 or LMS 301 to decoder 105. In operation CMCE 104 is initially connected via controllable switching element 201 under control of switch control 204 to supply communication channel information to decoder 105. CMCE 104 operates to generate simultaneously both the carrier frequency offset estimate $\hat{f}$ and the communication channel information as described above in relationship to FIG. 1.

Upon the carrier frequency offset estimate $\hat{f}$ generated by CMCE 104 falling below a predetermined threshold value switch control 204 sends a control signal to switching element 201 causing it to switch so that the communication channel information output from LMS 301 is supplied via switching element 201 to decoder 105.

LMS 301 is operative to generate the communication channel information, i.e., communication channel impulse response coefficients $w_{k+1}$ in accordance with equation (7) described above. Note that $w_{k+1}$ in equation (7) is a vector representing the last past generated communication channel impulse response coefficients, namely, $\mu(k)e(k)u_k^*$, which is being updated at time k in equation (7). To this end, LMS 301 generates $\mu(k)$ in accordance with equation (8), e(k) in accordance with equation (9) and y(k) in accordance with equation (10). Again, $u_k$ is a vector representative of a training sequence of symbols and $u_k^*$ is the conjugate of $u_k$.

Note that, in the embodiment of FIG. 3, the carrier frequency offset estimate $\hat{f}$ continues to be generated by CMCE and is supplied to integrator 106 where it is integrated over the entire data set to compensate it. The integrated frequency offset value is supplied to algebraic combiner 107 where it is, in this example, algebraically subtracted from carrier frequency $f_0$ to yield a compensated carrier frequency. The compensated carrier frequency output from algebraic combiner 107 is supplied to a second input of mixer 102.

What is claimed is:

1. Apparatus for generating an estimate of communication channel impulse response coefficients and for generating an estimate of carrier frequency offset of a received data signal having a magnitude, the apparatus comprising:

means supplied with said received data signal and a compensated carrier frequency for mixing said received data signal and said compensated carrier signal to generate a received signal; and first means supplied with said received signal for simultaneously generating a first estimate of said communication channel impulse response coefficients and a second estimate of said carrier frequency offset, wherein the magnitude of said received data signal is not dependent on said carrier frequency offset and said first estimate is essentially insensitive to said carrier frequency offset.

2. The invention as defined in claim 1 further including algebraic combining means for algebraically combining a representation of said carrier frequency offset estimate and a carrier frequency to compensate said carrier frequency for said carrier frequency offset.

3. The invention as defined in claim 2 wherein said algebraic combining means algebraically subtracts said representation of said carrier frequency offset estimate from said carrier frequency.

4. The invention as defined in claim 3 further including means for integrating said carrier frequency offset estimate to generate said representation of said carrier frequency offset estimate.

5. The invention as defined in claim 2 further including means supplied with said communication channel impulse response coefficients for decoding said received signal to obtain received data symbols.

6. The invention as defined in claim 2 further including antenna means for receiving said received data signal.

7. The invention as defined in claim 1 wherein said first means for simultaneously generating includes means for generating said communication channel impulse response coefficients in accordance with first prescribed criteria.

8. The invention as defined in claim 7 wherein said first prescribed criteria includes utilizing a magnitude version of said received signal, an estimate of said received signal, a version of a received training sequence of symbols and a step size.

9. The invention as defined in claim 1 wherein said first means for simultaneously generating includes means for generating said carrier frequency offset estimate in accordance with second prescribed criteria.

10. The invention as defined in claim 9 wherein said second prescribed criteria includes utilizing said received signal, a version of said received signal, a first version of an estimate of said received signal and a second version of said estimate of said received signal.

11. Apparatus for generating an estimate of communication channel impulse response coefficients and for generating an estimate of carrier frequency offset of a received data signal comprising:

means supplied with said received data signal and a compensated carrier frequency for mixing said received data signal and said compensated carrier signal to generate a received signal; and first means supplied with said received signal for simultaneously generating an estimate of said communication channel impulse response coefficients and an estimate of said carrier frequency offset including means for generating said communication channel impulse response coefficients in accordance with first prescribed criteria including generating said communication channel impulse coefficients in accordance with $w_{k+1}=w_k+\mu(k)(|d(k)|^2-|y(k)|^2)y(k)u_k^*$, where $w_{k+1}$ is an updated vector of the communication channel impulse response coefficients, $w_k$ is a row vector of the current communication channel impulse response coefficients, $\mu(k)$ is an update adaptation step size, $y(k)$ is an estimate of the received signal $d(k)$, and $u_k^*$ is the conjugate of vector $u_k$, a sequence of training symbols is represented by column vector $u_k$, $|d(k)|$ is the magnitude of $d(k)$ and $|y(k)|$ is the magnitude of $y(k)$.

12. The invention as defined in claim 11 wherein $y(k)=u_k w_k$.

13. The invention as defined in claim 12 wherein $u_k=[u(k), u(k-1), \ldots, u(k-M)]$, where $[u(k), u(k-1), \ldots, u(k-M)]$ is a training sequence of symbols and the dimension of vector $u_k$ is $1 \times M+1$.

14. The invention as defined in claim 13 wherein said adaptation step size is $$\mu(k)=\frac{\alpha}{|y(k)|[|d(k)|+|y(k)|]},$$

where $\alpha$ is a constant representative of a learning coefficient.

15. Apparatus for generating an estimate of communication channel impulse response coefficients and for generating an estimate of carrier frequency offset of a received data signal comprising:

means supplied with said received data signal and a compensated carrier frequency for mixing said received data signal and said compensated carrier signal to generate a received signal; and first means supplied with said received signal for simultaneously generating an estimate of said communication channel impulse response coefficients and an estimate of said carrier frequency offset including means for generating said carrier frequency offset estimate in accordance with second prescribed criteria including utilizing said received signal, a version of said received signal, a first version of an estimate of said received signal and a second version of said estimate of said received signal, wherein said received signal is $d(k)$, said version of said received signal $d^*(k+1)$, said first version of said estimate of said received signal is $y^*(k)$ and said second version of said estimate of said received signal is $y(k+1)$, where "*" denotes the conjugate operation.

16. The invention as defined in claim 15 wherein said second prescribed criteria generates said carrier frequency offset estimate in accordance with $$\hat{f}=\frac{\hat{\Omega}}{2\pi T_s}=\frac{1}{N}\sum_{k=1}^{N}\angle\{d(k)y^*(k)d^*(k+1)y(k+1)\},$$

$\hat{f}$ is said carrier frequency offset estimate, $\Sigma$ is a summation, $\angle$ is an angle and N is a number of time instants over which the angles are summed.

17. Apparatus for generating an estimate of communication channel impulse response coefficients and for generating an estimate of carrier frequency offset of a received data signal comprising:

means supplied with said received data signal and a compensated carrier frequency for mixing said received data signal and said compensated carrier signal to generate a received signal;

first means supplied with said received signal for simultaneously generating an estimate of said communication channel impulse response coefficients and an estimate of said carrier frequency offset; and algebraic combining means for algebraically combining a representation of said carrier frequency offset estimate and a carrier frequency to compensate said carrier frequency for said carrier frequency offset, said first means includes an input, a first output and a second output, said received signal being supplied to the first means input, said carrier frequency offset estimate being supplied at said first output and said communication channel impulse response coefficients being supplied at said second output, and further including second means having an input and at least one output supplied with said received signal to its input for generating at least an estimate of said communication channel impulse response coefficients at said at least one output and controllable switching means being responsive to the level of said carrier frequency offset estimate for controllably switching said communication channel impulse response coefficients from said second output of said first means or said at least one output of said second means.

18. The invention as defined in claim 17 wherein said second means for simultaneously generating includes means for generating said communication channel impulse response coefficients in accordance with third prescribed criteria.

19. The invention as defined in claim 18 wherein said third prescribed criteria includes generating said communication channel impulse coefficients in accordance with $w_{k+1}=w_k+\mu(k)e(k)u_k^*$, where $w_{k+1}$ is an updated vector of the communication channel impulse response coefficients, $w_k$ is a column vector of the current communication channel impulse response coefficients and $\mu(k)$ is an update adaptation step size.

20. The invention as defined in claim 19 wherein $$\mu(k)=\frac{\alpha}{\|u_k\|^2},$$

where $\alpha$ is a learning coefficient and $\|u_k\|^2$ is the squared $l_2$-norm of $u_k$; $e(k)=d(k)-y(k)$, where $d(k)$ is the received signal; and $y(k)$ is a prescribed estimate of $d(k)$ defined as y(k)=$u_k w_k$, where a training sequence of received symbols is represented by column vector $u_k$.

21. The invention as defined in claim 20 wherein said second means further includes means for generating said carrier frequency offset estimate in accordance with $$\hat{f} = \frac{\hat{\Omega}}{2\pi T_s} = \frac{1}{N}\sum_{k=1}^{N} \angle\{d(k)y^*(k)d^*(k+1)y(k+1)\},$$

where $\hat{f}$ is said carrier frequency offset estimate, $\Sigma$ is a summation, $\angle$ is an angle, d(k) is said received signal, y(k) is an estimate of d(k), "*" denotes the conjugate operation and N is a number of time instants over which the angles are summed.

22. Apparatus for generating an estimate of communication channel impulse response coefficients and for generating an estimate of carrier frequency offset of a received data signal having a magnitude, the apparatus comprising:
   a mixer for mixing said received data signal and a compensated carrier signal to generate a received signal; and
   a first estimation unit supplied with said received signal for simultaneously generating a first estimate of said communication channel impulse response coefficients and a second estimate of said carrier frequency offset,
   wherein the magnitude of said received data signal is not dependent on said carrier frequency offset and said first estimate is essentially insensitive to said carrier frequency offset.

23. The invention as defined in claim 22 further including an algebraic combiner for algebraically combining a representation of said carrier frequency offset estimate and a carrier frequency to compensate said carrier frequency for said carrier frequency offset.

24. The invention as defined in claim 23 wherein said algebraic combiner algebraically subtracts said representation of said carrier frequency offset estimate from said carrier frequency.

25. The invention as defined in claim 24 further including an integrator for integrating said carrier frequency offset estimate to generate said representation of said carrier frequency offset estimate.

26. The invention as defined in claim 23 further including a decoder supplied with said communication channel impulse response coefficients and said received signal for decoding said received signal to obtain received data symbols.

27. The invention as defined in claim 23 further including an antenna for receiving said received data signal.

28. The invention as defined in claim 22 wherein said first estimation unit generates said communication channel impulse response coefficients in accordance with first prescribed criteria.

29. The invention as defined in claim 28 wherein said first prescribed criteria includes utilizing a magnitude version of said received signal, an estimate of said received signal, a version of a received training sequence of symbols and a step size.

30. The invention as defined in claim 22 wherein said first means for simultaneously generating includes means for generating said carrier frequency offset estimate in accordance with second prescribed criteria.

31. The invention as defined in claim 30 wherein said second prescribed criteria includes utilizing said received signal, a version of said received signal, a first version of an estimate of said received signal and a second version of said estimate of said received signal.

32. Apparatus for generating an estimate of communication channel impulse response coefficients and for generating an estimate of carrier frequency offset of a received data signal comprising:
   a mixer for mixing said received data signal and a compensated carrier signal to generate a received signal; and
   a first estimation unit supplied with said received signal for simultaneously generating an estimate of said communication channel impulse response coefficients and an estimate of said carrier frequency offset including generating said communication channel impulse response coefficients in accordance with first prescribed criteria including generating said communication channel impulse coefficients in accordance with $w_{k+1}=w_k+\mu(k)(|d(k)|^2-|y(k)|^2)y(k)u_k^*$, where $w_{k+1}$ is an updated vector of the communication channel impulse response coefficients, $w_k$ is a column vector of the current communication channel impulse response coefficients, $\mu(k)$ is an update adaptation step size, y(k) is an estimate of the received signal d(k), and $u_k^*$ is the conjugate of vector $u_k$, a sequence of training symbols is represented by column vector $u_k$, |d(k)| is the magnitude of d(k) and |y(k)| is the magnitude of y(k).

33. The invention as defined in claim 32 wherein y(k)= $u_k w_k$.

34. The invention as defined in claim 33 wherein $u_k$=[u(k), u(k−1), . . . , u(k−M)], where [u(k), u(k−1), . . . , u(k−M)] is a training sequence of symbols and the dimension of vector $u_k$ is 1×M+1.

35. The invention as defined in claim 34 wherein said adaptation step size is $$\mu(k) = \frac{\alpha}{|y(k)|[|d(k)|+|y(k)|]},$$

where $\alpha$ is a constant representative of a learning coefficient.

36. Apparatus for generating an estimate of communication channel impulse response coefficients and for generating an estimate of carrier frequency offset of a received data signal comprising:
   a mixer for mixing said received data signal and a compensated carrier signal to generate a received signal; and
   a first estimation unit supplied with said received signal for simultaneously generating an estimate of said communication channel impulse response coefficients and an estimate of said carrier frequency offset including means for generating said carrier frequency offset estimate in accordance with second prescribed criteria including utilizing said received signal, a version of said received signal, a first version of an estimate of said received signal and a second version of said estimate of said received signal,
   wherein said received signal is d(k), said version of said received signal d*(k+1), said first version of said estimate of said received signal is y*(k) and said second version of said estimate of said received signal is y(k+1), where "*" denotes the conjugate operation.

37. The invention as defined in claim 36 wherein said second prescribed criteria generates said carrier frequency offset estimate in accordance with $$\hat{f} = \frac{\hat{\Omega}}{2\pi T_s} = \frac{1}{N}\sum_{k=1}^{N} \angle\{d(k)y^*(k)d^*(k+1)y(k+1)\},$$

$\hat{f}$ is said frequency offset estimate, $\Sigma$ is a summation, $\angle$ is an angle and N is a number of time instants over which the angles are summed.

38. Apparatus for generating an estimate of communication channel impulse response coefficients and for generating an estimate of carrier frequency offset of a received data signal comprising:

a mixer for mixing said received data signal and a compensated carrier signal to generate a received signal;

a first estimation unit supplied with said received signal for simultaneously generating an estimate of said communication channel impulse response coefficients and an estimate of said carrier frequency offset; and an algebraic combiner for algebraically combining a representation of said carrier frequency offset estimate and a carrier frequency to compensate said carrier frequency for said carrier frequency offset, wherein said first estimation unit includes an input, a first output and a second output, said received signal being supplied to the first estimation unit input, said carrier frequency offset estimate being supplied at said first output and said communication channel impulse response coefficients being supplied at said second output, and further including a second estimation unit having an input and at least one output supplied with said received signal to its input for generating at least an estimate of said communication channel impulse response coefficients at said at least one output and a controllable switching element being responsive to the level of said carrier frequency offset estimate for controllably switching said communication channel impulse response coefficients from said second output of said first estimation unit or from said at least one output of said second estimation unit.

39. The invention as defined in claim 38 wherein said second estimation unit generates said communication channel impulse response coefficients in accordance with third prescribed criteria.

40. The invention as defined in claim 39 wherein said third prescribed criteria includes generating said communication channel impulse coefficients in accordance with $w_{k+1}=w_k+\mu(k)e(k)u_k^*$, where $w_{k+1}$ is an updated vector of the communication channel impulse response coefficients, $w_k$ is a column vector of the current communication channel impulse response coefficients and $\mu(k)$ is an update adaptation step size.

41. The invention as defined in claim 40 wherein $$\mu(k) = \frac{\alpha}{\|u_k\|^2},$$

where $\alpha$ is a learning coefficient and $\|u_k\|^2$ is the squared $l_2$-norm of $u_k$; $e(k)=d(k)-y(k)$, where $d(k)$ is the received signal; and $y(k)$ is a prescribed estimate of $d(k)$ defined as $y(k)=u_k w_k$, where a training sequence of received symbols is represented by column vector $u_k$.

42. The invention as defined in claim 38 wherein said second estimation unit further generates said carrier frequency offset estimate in accordance with $$\hat{f} = \frac{\hat{\Omega}}{2\pi T_s} = \frac{1}{N}\sum_{k=1}^{N} \angle\{d(k)y^*(k)d^*(k+1)y(k+1)\},$$

where $\hat{f}$ is said carrier frequency offset estimate, $\Sigma$ is a summation, $\angle$ is an angle, $d(k)$ is said received signal, $y(k)$ is an estimate of $d(k)$, "*" denotes the conjugate operation and N is a number of time instants over which the angles are summed.

43. A method for generating an estimate of communication channel impulse response coefficients and for generating an estimate of carrier frequency offset of a received data signal having a magnitude, the method comprising the steps of:

mixing said received data signal and a compensated carrier frequency to generate a received signal; and simultaneously generating a first estimate of said communication channel impulse response coefficients and a second estimate of said carrier frequency offset, wherein the magnitude of said received data signal is not dependent on said carrier frequency offset and said first estimate is essentially insensitive to said carrier frequency offset.

44. The method as defined in claim 43 further including the steps of generating a representation of said carrier frequency offset estimate and algebraically combining said representation of said carrier frequency offset estimate and a carrier frequency to compensate said carrier frequency for said carrier frequency offset.

45. The method as defined in claim 44 further including the step of, in response to said communication channel impulse response coefficients, decoding said received signal to obtain received data symbols.

46. The method as defined in claim 44 further including the step of receiving said received data signal.

47. The method as defined in claim 43 wherein said step of simultaneously generating includes generating said communication channel impulse response coefficients in accordance with first prescribed criteria.

48. The method as defined in claim 47 wherein said first prescribed criteria includes utilizing a magnitude version of said received signal, an estimate of said received signal, a version of a received training sequence of symbols and a step size.

49. The method as defined in claim 43 wherein said step of simultaneously generating includes generating said carrier frequency offset estimate in accordance with second prescribed criteria.

50. The method as defined in claim 49 wherein said second prescribed criteria includes utilizing said received signal, a version of said received signal, a first version of an estimate of said received signal and a second version of said estimate of said received signal.

51. A method for generating an estimate of communication channel impulse response coefficients and for generating an estimate of carrier frequency offset of a received data signal comprising the steps of:

mixing said received data signal and a compensated carrier frequency to generate a received signal; and simultaneously generating an estimate of said communication channel impulse response coefficients and an estimate of said carrier frequency offset, wherein said first prescribed criteria includes generating said communication channel impulse coefficients in accordance with $w_{k+1}=w_k+\mu(k)(|d(k)|^2-|y(k)|^2)y(k)u_k^*$, where $w_{k+1}$ is an updated vector of the communication channel impulse response coefficients, $w_k$ is a column vector of the current communication channel impulse response coefficients, $\mu(k)$ is an update adaptation step size, y(k) is an estimate of the received signal d(k), and $u_k^*$ is the conjugate of vector $u_k$, a sequence of training symbols is represented by column vector $u_k$, |d(k)| is the magnitude of d(k) and |y(k)| is the magnitude of y(k).

52. The method as defined in claim 51 wherein $y(k)=u_k w_k$.

53. The method as defined in claim 52 wherein $u_k=[u(k), u(k-1), \ldots, u(k-M)]$, where $[u(k), u(k-1), \ldots, u(k-A)]$ is a training sequence of symbols and the dimension of vector $u_k$ is 1×M+1.

54. The method as defined in claim 53 wherein said adaptation step size is $$\mu(k) = \frac{\alpha}{|y(k)|[|d(k)|+|y(k)|]},$$

where α is a constant representative of a learning coefficient.

55. A method for generating an estimate of communication channel impulse response coefficients and for generating an estimate of carrier frequency offset of a received data signal comprising the steps of:

mixing said received data signal and a compensated carrier frequency to generate a received signal; and simultaneously generating an estimate of said communication channel impulse response coefficients and an estimate of said carrier frequency offset, wherein said received signal is d(k), said version of said received signal d*(k+1), said first version of said estimate of said received signal is y*(k) and said second version of said estimate of said received signal is y(k+1), where "*" denotes the conjugate operation.

56. The method as defined in claim 55 wherein said second prescribed criteria generates said carrier frequency offset estimate in accordance with $$\hat{f} = \frac{\hat{\Omega}}{2\pi T_s} = \frac{1}{N}\sum_{k=1}^{N} \angle\{d(k)y^*(k)d^*(k+1)y(k+1)\},$$

$\hat{f}$ is said carrier frequency offset estimate, Σ is a summation, ∠ is an angle and N is a number of time instants over which the angles are summed.

57. A method for generating an estimate of communication channel impulse response coefficients and for generating an estimate of carrier frequency offset of a received data signal comprising the steps of:

mixing said received data signal and a compensated carrier frequency to generate a received signal;

simultaneously generating an estimate of said communication channel impulse response coefficients and an estimate of said carrier frequency offset; and in response to said received signal, generating at least an estimate of said communication channel impulse response coefficients in accordance with a third criteria and in response to the level of said carrier frequency offset estimate for controllably switching said communication channel impulse response coefficients generated in accordance with said first criteria or said at least communication channel impulse response coefficients generated in accordance with said third criteria one output of said second means.

58. The method as defined in claim 57 wherein said third prescribed criteria includes generating said communication channel impulse coefficients in accordance with $w_{k+1}=w_k+\mu_k e(k)u_k^*$, where $w_{k+1}$ is an updated vector of the communication channel impulse response coefficients, $w_k$ is a column vector of the current communication channel impulse response coefficients and $\mu_k$ is an update adaptation step size.

59. The method as defined in claim 58 wherein $$\mu_k = \frac{\alpha}{\|u_k\|^2},$$

where α is a learning coefficient and $\|u_k\|^2$ is the squared $l_2$-norm of $u_k$; e(k)=d(k)−y(k), where d(k) is the received signal; and y(k) is a prescribed estimate of d(k) defined as $y(k)=u_k w_k$, where a training sequence of received symbols is represented by column vector $u_k$.

60. The method as defined in claim 59 further including a step of generating said carrier frequency offset estimate in accordance with $$\hat{f} = \frac{\hat{\Omega}}{2\pi T_s} = \frac{1}{N}\sum_{k=1}^{N} \angle\{d(k)y^*(k)d^*(k+1)y(k+1)\},$$

where $\hat{f}$ is said carrier frequency offset estimate, Σ is a summation, ∠ is an angle, d(k) is said received signal, y(k) is an estimate of d(k), "*" denotes the conjugate operation and N is a number of time instants over which the angles are summed.

* * * * *